US00RE39843E

(19) United States
(12) Reissued Patent
Wineland

(10) Patent Number: US RE39,843 E
(45) Date of Reissued Patent: Sep. 18, 2007

(54) APPARATUS TO ATTACH SENSORS ON EQUIPMENT WITH ROTATING SHAFTS

(76) Inventor: Gary W. Wineland, R.R. 2, Box 504, Roaring Spring, PA (US) 16673

(21) Appl. No.: 11/053,685
(22) Filed: Feb. 9, 2005

Related U.S. Patent Documents

Reissue of:
(64) Patent No.: 6,534,979
Issued: Mar. 18, 2003
Appl. No.: 09/947,590
Filed: Sep. 5, 2001

U.S. Applications:
(60) Provisional application No. 60/230,357, filed on Sep. 6, 2000, and provisional application No. 60/230,358, filed on Sep. 6, 2000.

(51) Int. Cl.
*G01P 1/02* (2006.01)
*G01P 1/07* (2006.01)
*G01P 3/48* (2006.01)

(52) U.S. Cl. ..... 324/262; 324/160; 324/173; 324/174; 324/207.25; 73/493; 73/866.5

(58) Field of Classification Search ..... 324/160, 324/173, 174, 178, 179, 207.13, 207.25, 324/207.21, 207.2, 251, 261, 262; 73/493, 73/514.39, 866.5; 335/296–306; 310/68 B
See application file for complete search history.

(56) References Cited

U.S. PATENT DOCUMENTS 4,466,196 A * 8/1984 Woodruff ..... 33/288
4,536,668 A * 8/1985 Boyer ..... 310/75 R
4,642,496 A * 2/1987 Kerviel et al. ..... 310/68 B
4,663,601 A * 5/1987 Troutman et al. ..... 335/207
4,769,624 A * 9/1988 Merritt et al. ..... 335/302
4,899,075 A * 2/1990 Hasebe ..... 310/257
5,048,954 A * 9/1991 Madey et al. ..... 356/155
5,087,879 A * 2/1992 Sugifune et al. ..... 324/207.25
5,089,775 A * 2/1992 Takeda ..... 324/174
5,424,635 A * 6/1995 Robinson et al. ..... 324/168
5,457,384 A * 10/1995 Alfors ..... 324/262
5,880,585 A * 3/1999 Oguro ..... 324/174
5,942,890 A * 8/1999 Reicks et al. ..... 324/173
6,109,120 A * 8/2000 Robinson et al. ..... 73/866.5
6,124,710 A * 9/2000 Kordecki ..... 324/207.2
6,964,209 B2 * 11/2005 Robinson et al. ..... 324/262

* cited by examiner

*Primary Examiner*—Edward Lefkowitz
*Assistant Examiner*—Kenneth J. Whittington
(74) *Attorney, Agent, or Firm*—John F. Letchford; Archer & Greiner, P.C.

(57) ABSTRACT

An apparatus for attaching sensors to rotating shafts on equipment includes a cup magnet and a housing for receiving the cup magnet. A target rotor is displaced within the housing which rotates when attached to a rotating shaft for the purpose of sensing the shaft rotation. Alternately, the cup magnet may be permanently attached to a rotating couple rather than a non-rotating housing. A preferred embodiment may have a dust cover.

8 Claims, 2 Drawing Sheets

EXPLODED VIEW

EXPLODED VIEW

EXPLODED VIEW

APPARATUS TO ATTACH SENSORS ON EQUIPMENT WITH ROTATING SHAFTS

Figure 1:
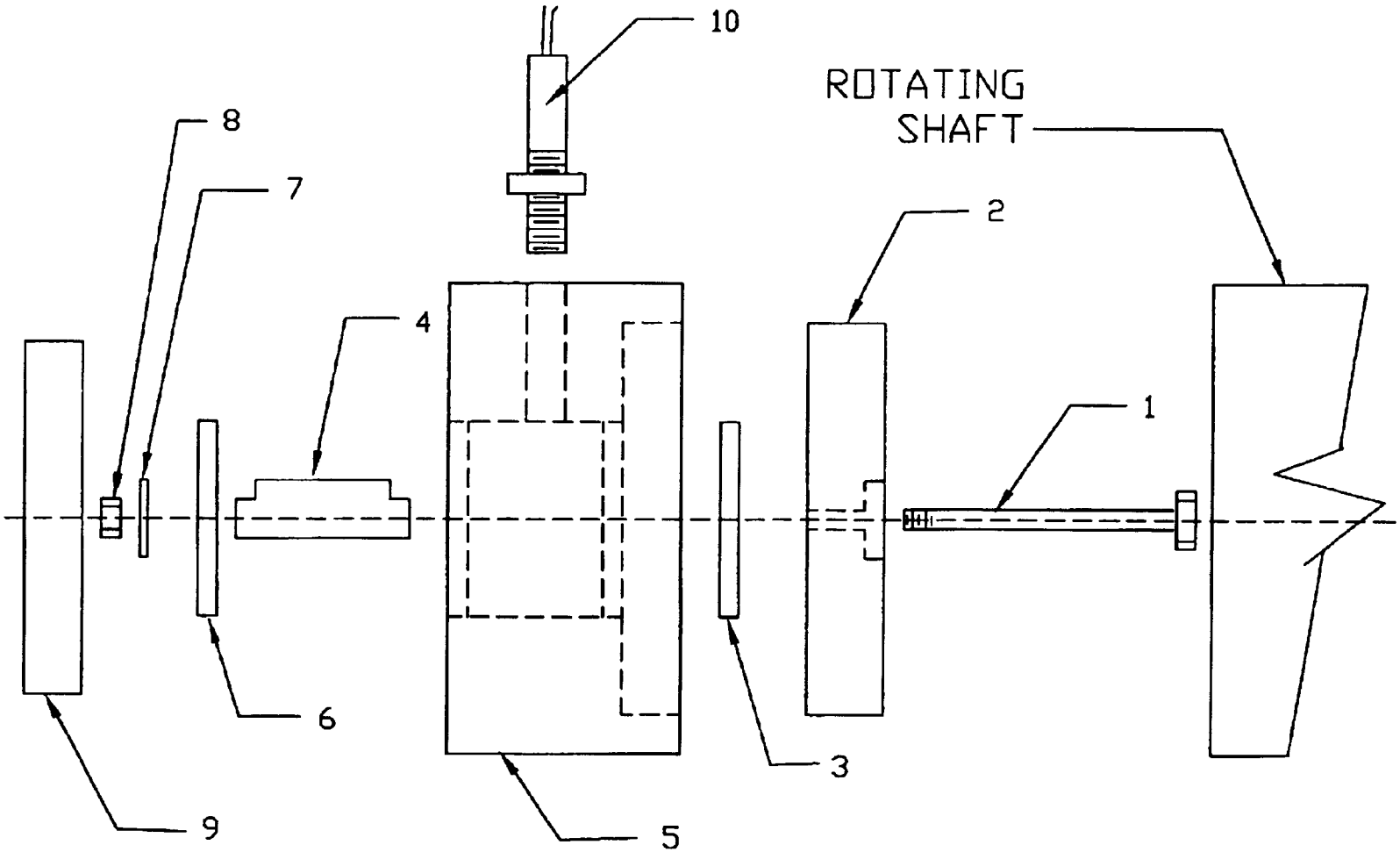

Matter enclosed in heavy brackets [ ] appears in the original patent but forms no part of this reissue specification; matter printed in italics indicates the additions made by reissue.

CROSS REFERENCES TO RELATED APPLICATION

This is a regular patent application based on provisional patent applications, filed Sep. 6, 2000 Application Ser. No. 60/230,357 and 60/230,358.

BACKGROUND OF THE INVENTION

This invention relates generally to the field of attaching sensors and targets, and more particularly to an apparatus to easily, simply and safely attach and operate motion detector sensors on equipment with rotating shafts.

In the past history of industry, it has always been necessary to determine if certain or all the equipment so pertaining to that particular plant are running. In recent years, many sensors have been developed. One in particular has been the proximity sensor. This sensor senses the presence of metal when a "metal target" comes close to its sensing head. Others are the magnetic reed sensor, capacitance sensor and the hall effect sensor. Most of industry today relies on the proximity sensor because of its standard configuration. It should be noted that the common term associated for all of these sensors are referred to as "motion sensors or motion switches" because the end result of their presence on the equipment is to determine if that particular piece of equipment is running. When mounted and wired on the equipment to be monitored a signal will be generated when the target passes the head of the sensor. This signal is sent to a control room or station where the information is used to alert personnel of the status of the equipment that is being monitored. In other words, the sensor detects motion of the turning shaft.

A proximity sensors that most widely used by industry currently which involves the placement of the sensor on equipment with rotating shafts. First, the shaft of the equipment being monitored needs to have a metal target attached to it. The target's purpose is to provide a presence of metal for the proximity sensor. This is usually accomplished by using a metal rod, key stock, flat bar or other metal and attaching it to the shaft. This is done by either welding or bolting the target to the shaft. Next, the sensor itself has to be mounted on the equipment close to the target that has been attached. This mounting of the sensor can be accomplished by either fabricating or purchasing a holder. The holder needs to be welded or bolted close to the target. Once this is accomplished, the equipment being monitored needs to be started and the sensor is adjusted so when the target on the rotating shaft goes past the head, a signal will be generated by the sensor. Or in other words, the sensor detected motion of the shaft.

Another method of monitoring rotating shaft equipment is by using shaft driven sensors or by using shaft driven sensor holders. The shaft driven sensors, commonly called encoders, need to have an orifice in the end of the rotating shaft of the equipment for the encoder's shaft to be inserted. That is done by drilling and or drilling and taping the shaft of the equipment being monitored. The encoder is then either inserted or screwed in the end of the equipment shaft. Another method of monitoring a rotating shaft is by using proximity sensor holders that have a shaft to rotate a target for the sensor that attaches to the holder. In this case, the shaft of the equipment being monitored needs to be drilled and or drilled and taped for the size of the holder shaft. After this is done, the holder shaft is inserted over or screwed in the equipment shaft.

In reference to all the above, a guard needs to be fabricated or purchased to cover the entire assembly of target, encoder, proximity sensor and proximity sensor holder. This is done for safety reasons.

Other prior art of mounting sensors to rotating shaft contain a similar concept where as a target rotor is attached to a sensor holder with a guard cover. But, unlike the invention here in being described, the problem of installation to the shaft of the equipment that is to be monitored still exists. In these cases, the shaft still needs to be drilled and tapped, coupled, or any means were by the device that holds the sensor and target can be attached to the shaft. These devices are sometimes referred to as a universal mount for sensors, but are not to be considered "self-attaching" as is the invention being discussed.

The deficiency of the prior technology of mounting sensors to rotating shaft equipment is that it takes much time and planning to install. It also takes numerous tools to complete, such as a welder, torches, drills, taps and hardware. It also needs the skills of a burner, welder and metal fabricator.

Further, when the equipment being monitored needs maintenance, such as a shaft bearing needing replaced, all of the mounted parts need to be disassembled. The sensor target needs to be either burnt off with a torch or unbolted from the shaft. The sensor itself will need to be removed from the equipment frame. The universal mounting devices need to be un-coupled from the shaft. Once the bearing is replaced, the entire reassembling and adjustments must be made.

Further deficiency of the prior technology of the installation of sensors and targets would be if a guard were not installed to cover both the sensor and the target. Serious bodily harm would occur. Serious injury could occur if a worker or others garments because entangled by the target that protrudes from the rotating shaft of the equipment being monitored. Also, if a worker or other place a finger close to the sensor head and the target passed in front of the head, a severe pinch point will happen. Even with the universal sensor mounts, there still is a rotating shaft that connects both the device and the equipment shaft. Further deficiencies of the prior technology of installation of sensors are that much planning must be done before the sensor is to be mounted. Holders need to be fabricated or purchased. Targets need to be fabricated. Guards need to fabricated or purchased. Personnel must be available when installation is to start. When this much planning has to happen, something is usually forgotten causing a delay in the installation. Further deficiency of the prior technology of installation of sensors is in the case of universal devices that have a target, guard and sensor mount. These devices need to have the shaft of the equipment being monitored either drilled and tapped or have a special coupler designed to fit over the shaft.

SUMMARY OF THE INVENTION

The primary object of the invention is to provide an apparatus that creates a self-attaining installation of sensors on rotating shaft equipment.

Another object of the invention is to provide an apparatus that has a built in target for the sensor to sense.

Another object of the invention is to eliminate the need for guards over sensors placed near rotating shafts.

A further object of the invention is to provide a quick and easy method of removing sensors when the equipment needs maintenance.

Yet another object of the invention is to provide a coupler in place of the housing where shaft driven sensors can use the benefit of this simple apparatus.

Still yet another object of the invention is to eliminate the need for special installation tools.

Still another object of the invention is to provide a quick release quality that prevents objects that can strike the invention from breaking it.

Still another object of the invention is to provide a quick release quality that keeps personnel from injury.

Other objects and advantages of the present invention will become apparent from the following description, taken in connection with the accompanying drawings, wherein, by way of illustration and example, an embodiment of the present invention is disclosed.

In accordance with a preferred embodiment of the invention, there is disclosed an apparatus for attaching sensors to rotating shafts on equipment having a cup magnet, a housing for receiving the cup magnet; and a target rotor displaced within said cup magnet attached to a rotating member for sensing.

In accordance with another preferred embodiment of the invention, there is disclosed an apparatus for attaching sensors to rotating shafts on equipment having a cup magnet for displacement about a rotating shaft, a housing for fixably receiving the cup magnet, and a fixation point for attachment of the housing to the shaft.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 2:
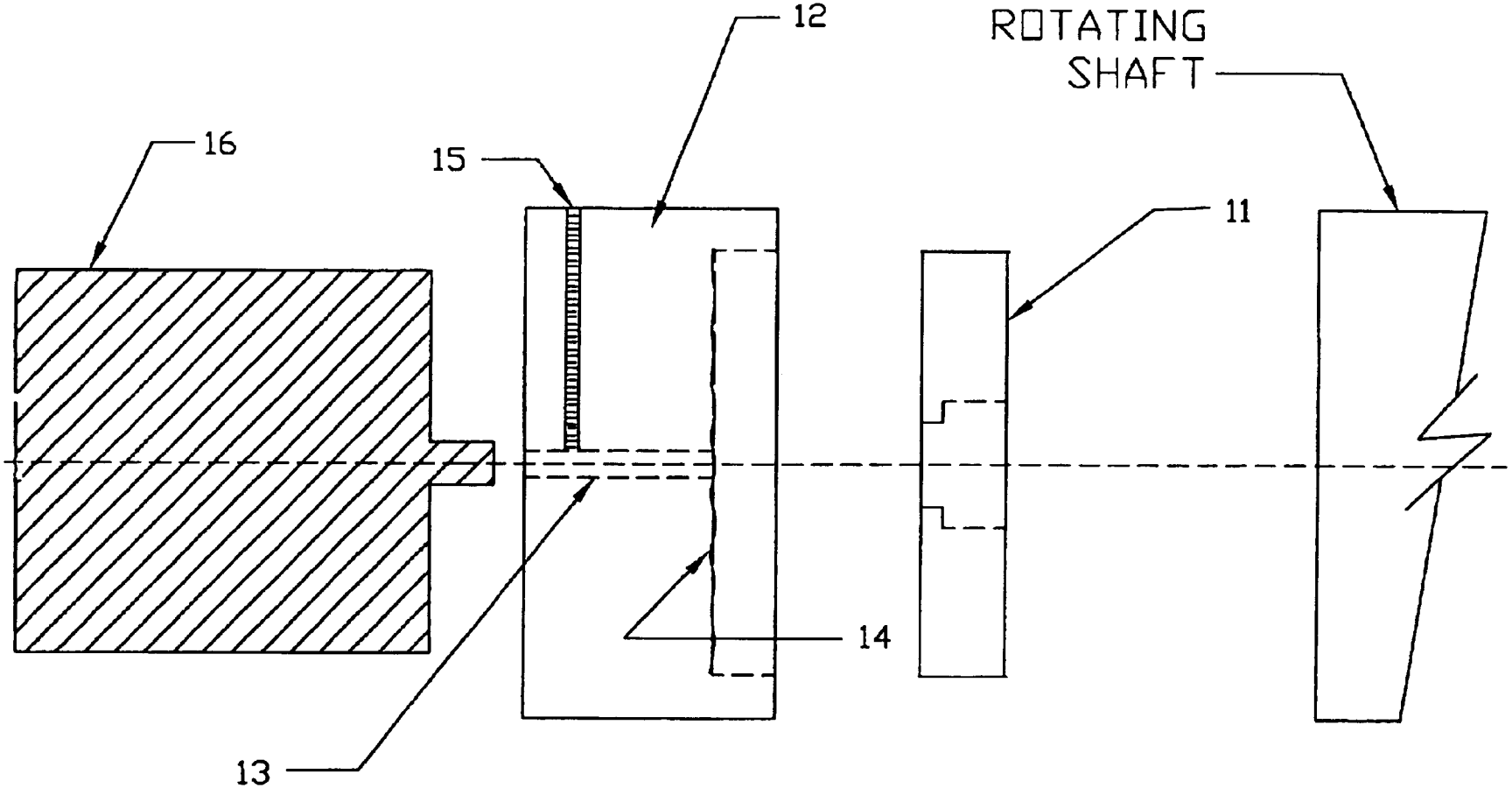

The apparatus that uses the sensor housing is best described by following the exploded views in FIG. 1 and FIG. 2. FIG. 1 shows an assembled sensor housing 1 is a standard ¼-inch by 2-inch bolt. Bolt 1 can be made of different materials such as alloy steel, stainless steel, brass or other material. It is inserted through cup magnet 2. Because cup magnet 2 is recessed, the head of the bolt does not protrude beyond the face of the magnets that are attached to the cup. Cup magnet 2 is a steel cup with attached magnets. The magnets can be neodymium, ceramic, alnico, etc. Because magnets are commonly not manufactured for structural strength, the magnets need to be attached to a strong backing such as a metal cup. Different materials could be used as a backing or cup such as aluminum, stainless steel or even hard plastics. When a backing material is selected the magnets can be epoxied, glued, or any other method wherein the magnets and the cup or backing become an integral part. In any selection of magnets or backing, the optimum performance would be the strongest holding power magnet with a ridged backing or cup. Because the installation demands that only the magnet comes in contact with the shaft or the equipment being monitored, any choice of a complete assembly of magnet and backing needs to be manufactured whereas the magnet protrudes beyond the backing or cup. In other words, then magnet is higher or deeper than the backing or cup. This is needed so when a complete apparatus is placed onto the end of the rotating shaft of a piece of equipment, only the magnet contacts the end of the shaft. Bearing 3, which, is then inserted over bolt 1. This bearing can be made of nylon, delrin or any material that can resist were and be of the size that would fit into the machined area of the housing. The actual purpose of bearing 3 is to provide a support and guide. Although a bearing is defined, alternative descriptions could include spacers or supports. Target rotor 4 is then inserted over bolt 1. Target rotor 4 is a steel tube which has an attached steel tab welded to the tube. This becomes the rotating target. Target rotor 4 in the apparatus shown in FIG. 1 also becomes the bushing for the complete unit. It should be noted that target rotor 4 is wider than machined cavity of machined housing 5. Therefore, when bolt 1, cup magnet 2, bearing 3, target rotor 4, bearing 6 and washer 7 are assembled and nut 8 is tightened onto bolt 1, it does not bind inside the cavity of machined housing 5. Because of this, when the magnetic cup assembly is rotated, the entire combination will turn freely inside of machined housing 5. Housing 5 material could be of any machinable or molded material that has characteristics that allow for of the operation of such a principal that has been discussed. The material used for the housing can be any whose properties allow for either machining, forming or molding but it should also be noted that because the entire principal operation of this apparatus depends on the magnets holding power to the shaft, the weight of housing 5 should be designed to be as little as possible. Bearing 6 on FIG. 1 is the same as bearing 3, which has been discussed. Washer 7 is a washer. Nut 8 is a nut used to secure housing 1. Dust cover 9 is used for simply keeping dust away from the internal parts although it is not required and the apparatus will operate without it. The complete assembled apparatus will then accept sensor 10, which is well known to those of skill in the art. Upon inserting sensor 10, the complete apparatus is now ready to "self-attach" to the machine shaft that is to be monitored. It should be noted that the above assembly of the apparatus would not be done by an end user or customer but rather the manufacturer of such a device. Therefore, when a customer or end user would purchase the apparatus being described, the mounting procedure would be a process where he or she would simply place the apparatus onto the end of the rotating shaft of the equipment that needs to be monitored. Because the inherit characteristic of the magnet cup assembly of the apparatus causes it to hold tightly the end of the shaft, rotation of the shaft causes the magnetic assembly to rotate also. And because the main elements are joined together, they all rotate as with the magnetic cup assembly. As previously noted, machined housing 5 is stationary as components 1,2,3,4,6 and 7 rotate. Therefore, as components 1,2,3,4,6 and 7 rotate inside machined housing 5, sensor 10 will become active as target rotor 4 passes its face.

In FIG. 2, the apparatus is shown with coupler 12. Cup magnet 11 is the exact identity as of the previous paragraphs that was described when used with the housing in FIG. 1. Therefore, all the properties of different types of magnets and cups or backings are identical to the previous description of FIG. 1. Cup magnet 11 is attached to coupler 12. The method of attachment is shown using epoxy 14, which is a bonding material. Other methods of attachment may include metal screws, pins, or glue. The only important quality of the attachment is that it be secure. Coupler 12 happens to be made of nylon, but any other material could be used. Some different materials could be steel, brass, or other plastics. The machine process of coupler 12 could also be used on these other materials. Other couplers, such as coupler nuts or threaded standoffs could be used in place of coupler 12. If, for example, the shaft size of sensor 16 happens to be a ⅜ thread, then a coupler nut with female threads of ⅜ could be used. Of course the method of attaching of these defined thread size couplers to the cup magnet would be different from the invention being discussed, the end result would be the same. Orifice 13 is a pilot orifice that has been machined into coupler 12. This orifice will be enlarged by the end user so as to accept the shaft size of the end user's sensor 16. The method of enlargement is done by drilling or machining. Sensor 16 has no association with the invention other than the invention itself was designed to adapt to the shaft size of sensor 16. Orifice 15 is a threaded orifice that will accept a setscrew so as to keep the shaft of sensor 16 from turning inside coupler 12 upon insertion of the shaft of sensor 16 into coupler 12. Other means of keeping the shaft of sensor 16 from turning inside coupler 12 could be epoxy or glue that is applied on the shaft of encoder 16 before insertion into coupler 12. Although this could be done, it would not be extremely difficult to remove encoder 16 from coupler 12. The set screw approach gives the advantage of easy removal. Upon completion of the drilling or machining and the insertion of sensor 16, the apparatus is ready to "self-attach" to the shaft of the equipment to be monitored. It should be noted that when an end user or customer receives this apparatus, the only process he or she needs to accomplish is to enlarge orifice 13 of the complete apparats. Once the enlargement is done, the shaft of the sensor is inserted into orifice 13 and a setscrew is inserted and treaded into orifice 15 and secured. The complete assembly is now placed on the end of the shaft of the equipment to be monitored. Because the inherit characteristic of the magnet cup assembly causes it to hold tightly to the shaft that is to be monitored, when this shaft rotates so does the entire assembly of cup magnet 11 and coupler 12. Further, because the shaft of the sensor is secured by a setscrew this is screwed into orifice 15, the shaft of sensor 16 will turn as when the apparatus does. Because the shaft of the sensor turns freely inside it's housing, the sensor will operate as it is designed.

The prior art of attaching sensors like a proximity sensor and targets can be said to be a process. After the end user purchases the actual sensor, many steps are needed to complete the actual installation. The initial step is to plan out the process. Fabrication of the target and guard assembly. Scheduling the skilled workers, as in a burner and welder for the time when the actual process is to begin. Making sure that the proper tools are available on the day the process is to begin. It should be also noted that the equipment the process is to be installed on must be shut down for an extended period of time while the process takes place.

The improved apparatus eliminates all of the deficiencies of the prior art. To characterize the improved apparatus can be simplified by focusing on the key part of the apparatus, which is the magnet assembly. Therefore the magnet creates the self-attaching goal of this improved invention.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for attaching sensors to rotating shafts on equipment comprising:

a rotatable cup magnet magnetically attachable to an end of [the] *a* rotating shaft;

a non-rotating housing for [receiving] *cooperating with* said cup magnet and [capable of] receiving a sensor;

a target rotor [displaced] *disposed* within said [cup magnet] *housing* and rotatable with the cup magnet as the cup magnet is rotated whereby the sensor senses the target rotor rotation as the cup magnet rotates in conjunction with the rotating shaft.

2. The apparatus of claim 1 [further comprising] *wherein the sensor is* a switch for sensing movement of said target rotor.

3. The apparatus of claim 1 further comprising a dust cover about said cup magnet.

4. An apparatus for attaching sensors to rotating shafts on equipment comprising:

a rotatable cup magnet magnetically attachable to an end of the rotating shaft;

a coupler for fixably receiving said cup magnet and capable of receiving a sensor;

a fixation point for attachment of [said coupler] *a sensor* to said [shaft] *coupler* whereby the sensor senses the rotation of the cup magnet in conjunction with the rotation of the shaft.

5. The apparatus of claim 4 wherein a setscrew is located at said fixation point.

6. The apparatus of claim 4 where said cup magnet is attached to said coupler with glue.

*7. Apparatus for sensing a rotating shaft on equipment comprising:*

*a sensor;*

*a rotatable cup magnet magnetically attachable to an end of the rotating shaft;*

*a non-rotating housing for cooperating with said cup magnet and capable of receiving said sensor;*

*a target rotor disposed within said housing and rotatable with said cup magnet as said cup magnet is rotated*

*whereby said sensor senses the target rotor rotation as the cup magnet rotates in conjunction with the rotating shaft.*

*8. Apparatus for sensing rotating shafts on equipment comprising:*

*a sensor device;*

*a rotatable cup magnet magnetically attachable to an end of the rotating shaft;*

*a coupler for fixably receiving said cup magnet and capable of receiving said sensor device;*

*a fixation point for attachment of said sensor device to said coupler*

*whereby said sensor device senses the rotation of said cup magnet in conjunction with the rotation of the shaft.*

* * * * *